Dec. 19, 1944.  E. M. MORRIS  2,365,353

MEASURING INSTRUMENT

Filed Aug. 31, 1943

EDWARD M. MORRIS
INVENTOR

BY
ATTORNEYS

Patented Dec. 19, 1944

2,365,353

UNITED STATES PATENT OFFICE 2,365,353

MEASURING INSTRUMENT

Edward M. Morris, Rochester, N. Y., assignor to Bausch & Lomb Optical Company, Rochester, N. Y., a corporation of New York Application August 31, 1943, Serial No. 500,653

10 Claims. (Cl. 33—174)

This invention relates to measuring instruments and more particularly to instruments for measuring the curvature of concave and convex surfaces and the planeness of surfaces.

An object of the present invention is to provide an instrument for accurately measuring and checking the degree of curvature of concave and convex surfaces. Another object of the present invention is to provide an instrument for measuring and checking the planeness of a surface. Another object of the present invention is to provide an adjustable measuring instrument for measuring and checking curved surfaces of variable areas. Another object of the present invention is to provide an adjustable measuring instrument for measuring and checking the planeness of surfaces for variable areas. These and other objects and advantages of the present invention reside in certain novel features of construction, arrangement and combination of parts as will hereinafter be more fully set forth and pointed out in the appended claims.

Referring to the drawing.

Figure 1:
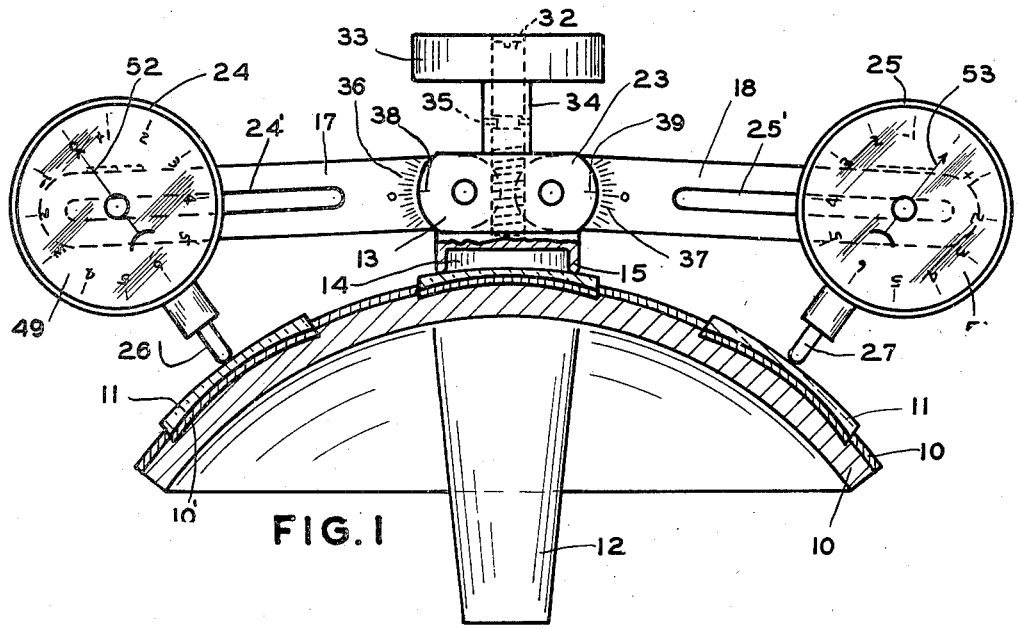
Fig. 1 is a front elevation showing one embodiment of my invention in use.
Figure 2:
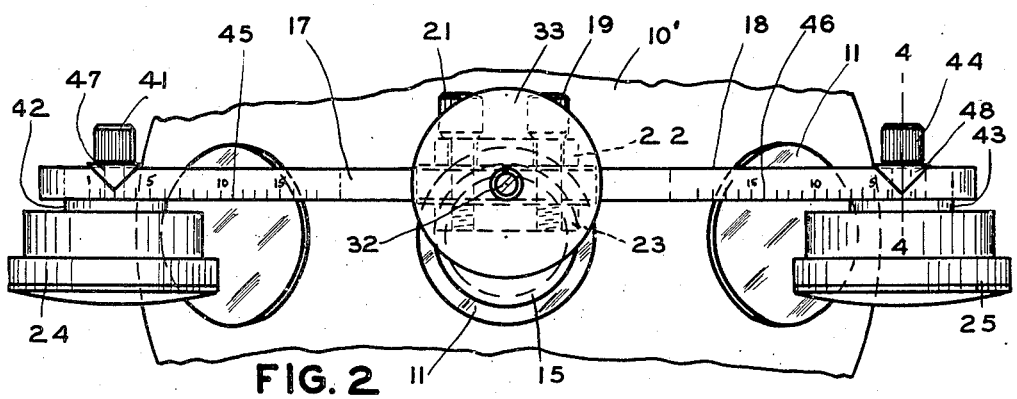
Fig. 2 is a top plan view of the same.
Figure 3:
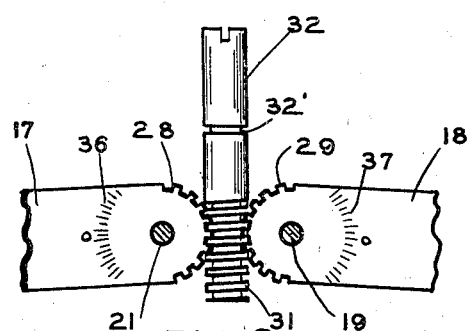
Fig. 3 is an enlarged front view showing the gear arrangement of the arms and their adjusting member.

For purposes of illustration, the preferred embodiment of the invention is shown in position for checking the degree of curvature of the convex surfaces of lenses 11 held in a layer of pitch 10' on block 10 supported centrally by a standard 12.

As is known in the art, a shell (not shown), having a concave abrading surface, is moved over the surfaces of lenses 11 so as to produce on the lenses spherical surfaces having the same curvature as the abrading surface of the shell.

It often occurs that the actual curvature formed on the lenses departs from the predetermined curvature desired on the lenses due to inaccuracies of the shell, uneven distribution of the abrasive, or improper relative movement between the lenses and the abrading shell. For this reason, it is necessary that during the grinding and polishing operations, the curvature of the lenses should be checked frequently to determine if the shell is reproducing or generating its curvature accurately on the surfaces of the lenses.

In its preferred embodiment, the measuring instrument of the present invention is particularly adapted to accurately determine any departure of the curvature of the lenses on the block by checking the curvature of the surface of the lenses with that of a standard block gauge having the required degree of curvature in the following manner. The instrument is first applied to the standard block gauge for conformation to the curvature thereof and then applied to the lenses lying on a meridian of the block by the application of the contacting members of the instrument preferably, but not necessarily, to the lenses disposed in the center and the outermost limits of the meridian. Any variation of the curvatures of the lenses on the block from that of the curvature of the standard block gauge will be indicated by either or both of the contacting members, connected to micrometer measuring or indicating members, disposed on the outermost limits of the surface of the lenses on the block. In this manner, the instrument very accurately checks the lenses on the block, for if the shell reproduces its curvature on the lenses, the degree of curvature of the lenses may be readily determined by checking the lenses collectively lying on one of the meridians of the lens block.

It is important to measure and check both curved and plane surfaces, in one or more meridians, at the outermost limits of the surface for the greater the area of the surface, the greater the tendency of the surface to depart from its true curvature or planeness. Checking and measuring local zones (in the illustrated case, selected individual lenses) may indicate true curvature or planeness of the zones, but when these zones are measured and checked collectively, it often occurs that the curvature or planeness of the entire surface will be found to depart from the standard surface having the predetermined desired degree of curvature or planeness.

The embodiment of the invention chosen for purposes of illustration comprises a frame 13 having a recessed central supporting portion 14 defined at its outer edge by a contact member or ring 15. The ring 15 is accurately formed with a perfectly ground radius for uniformly contacting the convex surface of the lens 11, or other surfaces having varying curvatures of convexity or concavity. The ring will also uniformly contact plane surfaces.

The frame 13 has a channel formed therein to receive two outwardly extending arms 17 and 18. These arms 17 and 18 are pivotally mounted within the channel by bolts 19 and 21, respectively, passing through openings in walls 22 and 23 of the frame 13 and the arms 17 and 18. The wall 23 is tapped to receive the threaded end of the bolts 19 and 21 to securely hold the arms in any adjusted angular position. The arms 17 and 18 are of equal length and weight to maintain the surface of the ring, seating upon the surface of the lens 11, in a state of equilibrium. Micrometer measuring or indicating members 24 and 25 of conventional type and of equal weight are disposed in slots 24' and 25' extending lengthwise in each of the arms 17 and 18.

To control the pivotal movement of the arms 17 and 18 for conforming the measuring instrument with the contact members or plungers 26 and 27 of the indicating members 24 and 25 normal to and contacting the surfaces, the edges of the arms 17 and 18, mounted in the channel of the frame 13, are formed to provide gear teeth 28 and 29, respectively, engageable with a worm 31 of a screw member 32. The member 32 is rotatably disposed in a bore formed in a handle 33 having its shank 34 integral with the frame 13. To permit rotation of the member 32 for movement of the arms 17 and 18 without displacement of the member 32, an annular groove 32' is formed in the member 32 for receiving retaining pins 35 driven into openings in the shank 34. The rotation of the member 32, through the engagement of a suitable tool with the notch formed in its top portion, will move the arms 17 and 18 simultaneously in separate arcuate paths in a common plane about the frame 13. Graduated scales 36 and 37 carried by the arms 17 and 18, respectively, are adapted to cooperate with index marks 38 and 39 on the frame 13. These scales may be calibrated to read in diopters, degrees of angularity, or other measurement value desired.

The indicating members 24 and 25 are slidably and rotatably mounted in longitudinal slots 24' and 25' of the arms 17 and 18, respectively. The member 24 is movably mounted on the arm 17 by a bolt 41 passing through the slot of the arm 17 and engaging a tapped opening in a collar 42 secured to the indicating member. The member 25 is similarly mounted on the slot of the arm 18 with its collar 43 engaged by a bolt 44. Thus, by turning the bolts, the members 24 and 25 may be rotated, and also slid longitudinally, in the slots formed in the arms 17 and 18 and securely held therein.

Figure 4:
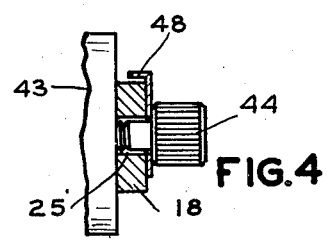
Fig. 4 is an enlarged sectional view on line 4—4 of Fig. 2.

It is necessary to maintain the indicating members 24 and 25 in similar spaced positions on the arms 17 and 18 relative to the vertical axis of the frame in order to secure optimum performance of the instrument in use. To insure the accurate spacing of the indicating members relative to the vertical axis of the frame 13, scales 45 and 46 are had on the arms 17 and 18, respectively, to cooperate with pointers 47 and 48 secured by the bolts 41 and 44 of the indicating members, as shown in Fig. 4.

Although they may be used for other purposes, in the preferred embodiment of the invention, the scales 36, 37, and 45, 46, cooperating with the index marks 38, 39 and the pointers 47, 48, respectively, are used to secure a preliminary setting of the instrument to conform to curved or plane surfaces used as standards.

After the instrument is placed on the surface with the ring 15 of the frame 13 supporting the instrument and the plungers 26 and 27 contacting the surface, the dials 49 and 51 are annularly adjustable on the faces of the indicating members to adjust their zero points in alignment with the hands 52 and 53.

The plungers 26 and 27 actuate mechanisms of the indicating members to indicate on their dials 49 and 51 any departure of a measured surface from that of the standard surface. They will, therefore, indicate any departure of the curvature of the lenses from the curvature of the standard block on their graduated dials.

In the use of the instrument to check the curvature of a convex or concave surface, it is first necessary to position the contact points of the plungers 26 and 27 normal to and contacting the curved surface of the standard gauge at its outermost limits with the hands of the dials in alignment with the zero graduations on the dials.

In positioning the contact points of the plungers normal to the surface, the instrument is placed on the standard with its ring 15 contacting the surface. The screw member 32 is rotated to raise or lower the arms 17 and 18 and the indicating members are slide in the slots of the arms 17 and 18 to a position adjacent the edge surface of the block. At this time, the indicating members are rotated to dispose the contact points of their plungers normal to the surface in contacting engagement therewith. The arms 17, 18 and the indicating members 24, 25 are then secured in position by their respective bolts. The dials 49 and 51 are rotated to adjust their zero readings in alignment with the hands 52 and 53. The instrument is now properly adjusted to check the radius of curvature of a convex surface such as defined by the lenses 11 on the lens block 10, by comparison to the radius of the curvature of the standard surface.

The instrument is then placed upon the surface to be checked, as the lenses 11 on block 10. Any deviation of the hands from the zero readings will indicate a departure of the curvature of the checked surface from that of the curvature of the standard surface. The instrument may also be used in measuring and checking the planeness of a surface by the above-recited manipulation of the arms and indicating members to conform to a plane reference surface and then to the surface to be measured.

In the application of the instrument to the measurement and checking the planeness of a surface, the instrument is placed with its ring 15 contacting the central portion of a plane surface, for example, an optical flat, and the arms 17 and 18 and the indicating members 24 and 25 adjusted to position the plungers 26 and 27 normal to and contacting the surface, the dials being then rotated to their zero reading positions. The instrument is then placed upon the surface to be measured and moved across the surface to thereby check three portions of the surface at one time and is then rotated 90° and again moved across the surface. In this manner, the surface is accurately checked and any departure from planeness is shown by the deflection of the dial hands from their zero reading positions.

The measuring instrument of the present invention can very accurately determine the departure of the curvature or planeness of a surface from that of the standard curved or plane surface. It is highly efficient in this respect as each indicating member will immediately detect any variation of the other from the zero reading given by the standard surface. This is important, as due to the accurate measurements demanded of the indicating members 24 and 25, their delicate mechanisms are often disturbed by even the careful handling of instruments employing these members by skilled workmen or they may be improperly set to their zero positions on the standard. Also, the indicating members of the instrument may read inaccurately due to foreign substances on the standard surface or measured surface. As a result, the surface measured will always show a departure from the standard surface, even though the curvature or planeness of the surfaces are identical. By detecting this variation, the measuring instrument of the present invention possesses decided advantages over instruments employing single indicating members, for the surface measured may be accurately checked by the instrument even though one of the indicating members does not conform to the standard.

This important feature of the present invention is illustrated in the following examples. In one of two conditions possibly occurring in the use of the instrument, if the reading should be zero on the left dial and the reading on the right dial is +2 on the measured surface, it would at first indicate that the right side of the surface had a high condition, the surface is then reversed 180° and the left dial then reads zero and the right dial still reads +2. It is, therefore, evident that the surface conforms to the standard surface but that the indicating member has been originally improperly set on the standard and, therefore, proper adjustment to zero has not been made to the right dial, or the right dial mechanism has been dislocated in handling, or foreign substances are on either of the surfaces. If desired, this condition may be readily checked by comparison to the standard surface which will invariably indicate the right dial reading is +2. Upon correction of the right dial and application of the instrument to the measured surface, the readings on the dials will be 0—0.

In the second condition, upon application to the measured surface, suppose the reading on the left dial is zero and the right dial reads +2. The surface is then reversed 180° and the reading on the left dial is now +2 and the right dial now reads zero. In this case, it is immediately apparent that the planeness or radius of curvature of the measured surface varies from that of the standard surface. If desired, this condition may be also checked by comparison to the standard surface which will invariably indicate the dial readings to be 0—0.

In these cases, it is evident that the planeness or curvature of the compared surface receives a dual measurement of its accuracy by the employment of the standard in fixing the correct planeness or curvature of the measuring instrument and also by the relative measurement of the indicating members checking each other as well as the planeness or curvature of the measured surface.

In the foregoing illustrations, the measuring instrument of the present invention is used to determine the departure of the curvature of a surface from the known curvature of a standard surface and also to determine and check the planeness of a surface with a known plane surface, and is, therefore, adapted in these uses as a comparator. It may, however, be readily adapted for use to measure directly the curvature of a surface in diopters, or other measurement value.

To adapt the instrument for measuring directly the curvature of a convex or concave surface in diopters, the scales 36 and 37 of the arms 17 and 18 are calibrated in diopter readings, the scales being each divided by the zero into minus readings on their upper portions and plus readings on their lower portions, each graduation equalling one diopter. The indicating members 24 and 25 are replaced by similar conventional members differing therefrom in size so that the contact points of the plungers are in alignment in a horizontal plane with the contacting surface of the ring 15 when the zero graduations of the scales 36 and 37 of the arms 17 and 18 register with the index marks 38 and 39 on the frame 13, and also the dials of the substituted indicating members are calibrated in fractions of a diopter, one complete revolution of the hands on each dial in a clockwise direction equalling one diopter.

In the operation of the modified instrument, the instrument is placed on a plane surface. The contact points of the plungers will then be in alignment with the contacting surface of the ring 15 with the zero readings on the arms registering with the index marks 38 and 39 on the frame 13. The dials are then rotated so that the hands are in their zero positions.

The instrument is then properly adjusted to directly measure the radius of curvature of any concave or convex surface. To do this, the instrument is removed from the plane surface and placed upon the curvature surface and the arms 17, 18 and the indicating members adjusted to position their plungers perpendicular to and contacting the surface to actuate the mechanism of the indicating members to obtain readings on their dials. The readings on the scales 36 and 37 will then indicate similar duplicate unit values of the curvature of the surface in diopters and the readings on the dials will indicate, in duplicate, fractions of a diopter unit of the curvature of the surface. By combining one of the duplicate sets of unit values and one of the duplicate sets of fractional values, the measurement of the radius of curvature of the convex or concave surface may be then had in diopters and fractions of a diopter. It can be readily seen that these readings will indicate plus diopters if the surface is convex and minus diopters if the surface is concave.

From the foregoing it will be apparent that I am able to attain the objects of my invention, and provide a new and improved measuring instrument which can be used as a comparator to measure and check curved and plane surfaces of variable areas, and also as a measuring instrument to measure directly the curvature of convex and concave surfaces. Various modifications may be made without departing from the spirit of my invention.

I claim:

1. In a measuring instrument, a frame; a contact member carried by said frame and adapted to seat upon a surface being measured; a plurality of arms pivotally mounted on said frame and extending outwardly therefrom; means for moving said arms in arcuate paths about said frame; indicating members rotatably carried by said arms and movable longitudinally thereof, the pivotal movement of said arms and the longitudinal movement of said indicating members disposing said indicating members adjacent said surface; and reciprocatory contact members connected to said indicating members and adapted to actuate said indicating members to indicate a measurement of said surface, the movement of said arms and said indicating members disposing said reciprocatory members normal to said surface and in contacting engagement therewith.

2. In a measuring instrument, a frame; a contact member carried by said frame and adapted to seat upon a surface being measured; a plurality of arms pivotally mounted on said frame and extending laterally therefrom; means for simultaneously moving said arms in arcuate paths about said frame; indicating members rotatably carrried by said arms and movable longitudinally thereof, the pivotal movement of said arms and the longitudinal movement of said indicating members disposing said indicating members adjacent said surface; reciprocatory contact members connected to said indicating members and adapted to be adjusted normal to said surface and in contacting engagement therewith by the rotation of said rotatable members, the movement of said reciprocatory members contacting said surface actuating said indicating members to indicate a measurement of said surface; and means for securing said arms and said indicating members in said positions.

3. In a measuring instrument, a frame; a contact member carried by said frame and adapted to seat upon a surface being measured; a plurality of arms pivotally mounted on said frame and extending outwardly therefrom; gear means carried by said frame and said arms for simultaneously moving said arms in arcuate paths about said frame; indicating members rotatably carried by said arms and movable longitudinally thereof; reciprocatory contact members connected to said indicating members and adapted to actuate said indicating members to indicate a measurement of said surface, the movement of said arms and said indicating members disposing said reciprocatory members normal to said surface and in contacting engagement therewith; and means for securing said arms and said indicating members in said position.

4. In a measuring instrument, a frame; a ring carried by said frame and adapted to seat upon a surface being measured; a plurality of arms pivotally mounted on said frame and extending laterally therefrom in a common plane; means for simultaneously moving said arms in arcuate paths about the horizontal axis of said frame; indicating members rotatably carried by said arms and movable longitudinally thereof to and from said frame, the pivotal movement of said arms and the longitudinal movement of said indicating members disposing said indicating members adjacent said surface; reciprocatory contact members connected to said indicating members and adapted to be adjusted normal to said surface in contacting engagement therewith by the rotation of said rotatable members, the movement of said reciprocatory members contacting said surface actuating said indicating members to indicate a measurement of said surface; and means for securing said arms and said indicating members in said positions.

5. In a measuring instrument, a frame; a contact member carried by said frame and adapted to seat upon a surface being measured; a plurality of arms pivotally mounted on said frame and extending outwardly therefrom; gears disposed on the mounted extremities of said arms; a screw member carried by said frame for engagement with said gears, the rotation of said screw member moving said arms angularly of each other in a common plane; indicating members rotatably carried by said arms and movable longitudinally thereof; and reciprocatory contact members connected to said indicating members and adapted to actuate said indicating members to indicate a measurement of said surface, the movement of said arms and said indicating members disposing said reciprocatory members normal to said surface and in contacting engagement therewith.

6. In a measuring instrument, a frame; a contact member carried by said frame and adapted to seat upon a surface being measured; a plurality of arms connected to said frame and extending laterally therefrom, said arms having slots formed longitudinally therein; means for moving said arms in arcuate paths about said frame; indicating members rotatably carried in said slots for movement longitudinally of said arms, the arcuate movement of said arms and the longitudinal movement of said indicating members disposing said indicating members adjacent said surface; a scale carried by each of said arms for determining the location of each indicating member to the vertical axis of said frame; reciprocatory contact members connected to said indicating members and adapted to be adjusted normal to said surface in contacting engagement therewith by the rotation of said rotatable members, the movement of said reciprocatory members contacting said surface actuating said indicating members to indicate a measurement of said surface.

7. In a measuring instrument, a frame; a contact member carried by said frame and adapted to seat upon a surface being measured; a plurality of arms pivotally connected to said frame and extending laterally therefrom; means for moving said arms in arcuate paths about said frame; index marks carried by said frame; a scale carried by each of said arms and cooperative with said index marks; indicating members rotatably carried by said arms and movable longitudinally thereof, the arcuate movement of said arms and the longitudinal movement of said indicating members disposing said indicating members adjacent said surface; reciprocatory contact members connected to said indicating members and adapted to be adjusted normal to said surface by the rotation of said indicating members, the movement of said reciprocatory members contacting said surface actuating said indicating members to indicate a measurement of said surface.

8. In a measuring instrument, a hollow frame; a fixed contact member supporting said frame and having a contacting ring adapted to seat upon the surface being measured; a plurality of arms pivotally mounted on said frame and extending laterally therefrom; gears formed on the mounted extremities of said arms; a screw member carried in said frame for engagement with said gears, the rotation of said gears simultaneously moving said arms angularly of each other in a common plane; index marks carried by said frame; a scale carried by each of said arms and cooperative with said index marks; indicating members rotatably carried by said arms and movable longitudinally thereof, the angular displacement of said arms and the longitudinal movement of said indicating members disposing said indicating members adjacent said surface; an index mark carried by each of said indicating members; a scale carried by each of said arms and cooperative with said second-named index marks; reciprocatory contact members carried by said indicating members and adapted to be adjusted normal to said surface in contacting engagement therewith by the rotation of said indicating members, the movement of said reciprocatory members actuating said indicating members to indicate a measurement of said surface; and means for securing said arms and said indicating members in said position.

9. In a measuring instrument a frame; a contact member fixed to said frame and adapted to seat upon a surface to be measured; a plurality of arms pivotally mounted on said frame and extending outwardly therefrom; an indicating member rotatably carried by each arm and movable longitudinally thereof; and reciprocatory contact members connected to said indicating members and adapted to actuate said indicating members to indicate a measurement of said surface when the contact members are perpendicular to said surface, said arms and said indicating members being adjustable so that said contact members can be disposed normal to said surface and in contacting engagement therewith.

10. In a measuring instrument a frame; a contact member fixed to said frame and adapted to seat upon a surface to be measured; a plurality of arms pivotally mounted on said frame and extending outwardly therefrom; an indicating member rotatably carried by each arm and movable longitudinally thereof; reciprocatory contact members connected to said indicating members, said indicating members being rotatably adjustable to position said contact members normal to said surface when said arms are pivotally adjusted to move said contact members into engagement with said surface; and means for securing said arms and said indicating members in desired adjusted positions, movement of said reciprocatory contact members when contacting said surface actuating said indicating members to indicate a measurement of said surface.

EDWARD M. MORRIS.